(12) United States Patent
Goebbel et al.

(10) Patent No.: US 7,833,498 B2
(45) Date of Patent: Nov. 16, 2010

(54) PIPE ASSEMBLY REACTOR COMPRISING A HELICALLY SHAPED CROSS SECTION

(75) Inventors: Hans-Georg Goebbel, Kallstadt (DE); Peter Bassler, Viernheim (DE); Joaquim Henrique Teles, Otterstadt (DE); Peter Rudolf, Landenburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1156 days.

(21) Appl. No.: 10/586,135

(22) PCT Filed: Jan. 20, 2005

(86) PCT No.: PCT/EP2005/000532

§ 371 (c)(1), (2), (4) Date: Jul. 17, 2006

(87) PCT Pub. No.: WO2005/068062

PCT Pub. Date: Jul. 28, 2005

(65) Prior Publication Data

US 2007/0178029 A1    Aug. 2, 2007

(30) Foreign Application Priority Data

Jan. 20, 2004   (DE)   .................. 10 2004 003 003

(51) Int. Cl.
F28D 15/02    (2006.01)

(52) U.S. Cl. .................. 422/201; 422/198; 549/529; 549/531

(58) Field of Classification Search ............ 422/198, 422/201; 502/60; 549/529, 531
See application file for complete search history.

(56) References Cited

U.S. PATENT DOCUMENTS 3,357,916 A    12/1967   Smith

2002/0064487 A1 *   5/2002   Sederquist et al. .......... 422/197

FOREIGN PATENT DOCUMENTS

| | | |
|---|---|---|
| DE | 24 05 606 | 8/1975 |
| DE | 42 22 109 | 1/1994 |
| DE | 197 23 949 | 12/1998 |
| EP | 0 311 983 | 4/1989 |
| EP | 0 405 978 | 1/1991 |
| GB | 2213922 A * | 8/1989 |
| WO | 92 06918 | 4/1992 |
| WO | 98 54086 | 12/1998 |
| WO | 98 55228 | 12/1998 |

OTHER PUBLICATIONS

Hoelderich, W. F.,"Zeolites: Catalysts for the Synthesis of Organic Compounds", Elsevier Science Publishers B.V., vol. 49, pp. 69-93, 1989.

Notari, B.,"Synthesis and Catalytic Properties of Titanium Containing Zeolites", Elsevier Science Publishers B.V., vol. 37, pp. 413-425, 1987.

Baerlocher, Ch. et al.,"Atlas of Zeolite Framework Types", Elsevier 5th Edition, pp. 184-185, 2001.

Elvers, B. et al.,"Ullmann's Encyclopedia of Industrial Chemistry", 5th Edition, Hydrogen Peroxide, vol. 13, pgs. 447-457.

* cited by examiner

Primary Examiner—Janet L Andres
Assistant Examiner—David E Gallis
(74) Attorney, Agent, or Firm—Oblon, Spivak, McClelland, Maier & Neustadt, L.L.P.

(57) ABSTRACT

Process and apparatus for the continuous preparation of a chemical compound in at least one reactor, where at least one of the reactors is a shell-and-tube reactor which has a shell and at least one internal tube located within the shell, wherein at least one of the internal tubes has, at least in part, a noncircular cross section and a helical configuration in the region in which it is surrounded by the shell.

20 Claims, 4 Drawing Sheets

PIPE ASSEMBLY REACTOR COMPRISING A HELICALLY SHAPED CROSS SECTION

Figure 1A:
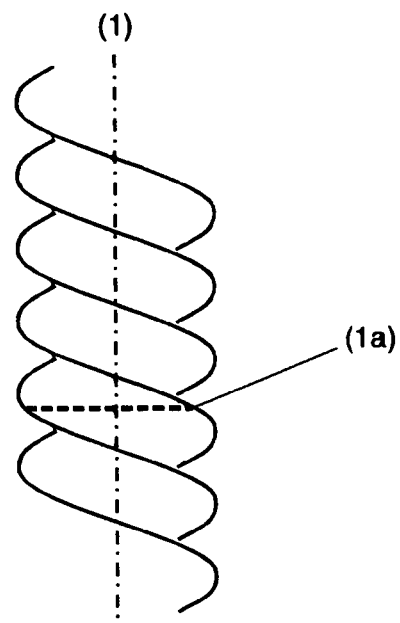

The present invention relates to a process for the continuous preparation of a chemical compound, wherein a specially designed shell-and-tube reactor is used in at least one reactor used for the preparation of this compound. The present invention likewise relates to an apparatus for the continuous preparation of a chemical compound, wherein this apparatus comprises at least one of these specially designed shell-and-tube reactors, and optionally at least one separation device.

In numerous chemical processes in which at least one compound is prepared, at least one of the reactions which leads from at least one starting material to this compound is exothermic in nature. Particularly when reactions are carried out on a pilot plant scale or industrial scale, this results in the problem of quickly and efficiently removing the heat generated during this reaction.

One type of construction of chemical reactors which is used particularly to achieve good heat removal is the so-called shell-and-tube reactor. In such a reactor, straight parallel internal tubes are present in the interior of a cylindrical shell and are welded into a lower tube plate and an upper tube plate. The reaction solution flows through the internal tubes, wherein a product which is present in the output from the reactor is formed from a starting material which is present in the inflowing reaction solution during passage of the reaction solution through the tubes. As a rule, a cooling medium flows through the outer region bounded by the tube plates, the inside of the cylindrical shell and the outsides of the internal tubes and carries away the heat which is evolved during the reaction and is conducted from the internal tubes through the walls of the internal tubes. The flow through the tubes of the usually vertical shell-and-tube reactors is in most cases from the bottom upward. However, the flow from the top downward is also conceivable.

Transverse flow of the coolant onto the interior tubes has been found to be ideal over the course of time. In the known shell-and-tube reactors, this is achieved to some extent by installation of deflection plates. These deflection plates, which act as baffles, make the cooling medium flow in a meandering fashion through the outer region.

A disadvantage of this widespread construction is the non-uniform distribution of the flow. The use of the deflection plates results on the one hand in formation of regions in which the cooling medium flows very fast and very good heat transfer can be achieved and on the other hand in formation of regions which represent dead zones in which the coolant flows only very slowly, if at all, and the heat transfer is poor.

Such dead zones are disadvantageous because, inter alia, the temperatures resulting from unsatisfactory removal of heat in individual reactor regions can have an adverse effect on the reaction. Furthermore, it has to mentioned that temperature peaks may occur, and that these are not acceptable due to safety-related considerations.

Optimization of the flow behavior could be achieved, for example, by increasing the number of deflection plates. However, this inevitably leads to an increase in the pressure drop in the cooling medium, which has an adverse effect on the pumping capacity of the pumps which are normally used to make the cooling medium flow through the outer region.

One of the objectives of the present invention is therefore to provide a process for the continuous preparation of a chemical compound, which does not have these disadvantages.

The present invention accordingly relates to a process for the continuous preparation of a chemical compound in at least one reactor, wherein at least one of the reactors is a shell-and-tube reactor which has an outer tube as shell and at least one internal tube located within the shell, wherein at least one of the internal tubes has, at least in part, a noncircular cross section and a helical configuration in the region in which it is surrounded by the shell.

The term "shell-and-tube reactor" as used in the context of the present invention refers to a reactor which has at least one shell of any geometry in whose interior at least one internal tube, preferably several internal tubes, is/are located.

The term "tube having a helical configuration" as used in the context of the present invention refers quite generally to a twisted tube. Accordingly, the term "tube having a helical configuration" comprises an embodiment according to which the at least one internal tube having the noncircular cross section is twisted around at least one linear axis. The term likewise comprises an embodiment in which this at least one axis is nonlinear, at least in part. The term accordingly also comprises an embodiment in which the at least one tube twisted around a linear axis or around an at least partly nonlinear axis is wound around at least one further linear or at least partly nonlinear axis.

The present invention also comprises embodiments in which the at least one internal tube has a noncircular cross section and a helical configuration in all of the region in which the tube is surrounded by the shell. It comprises embodiments in which the at least one interior tube has a single cross section or two or more different cross sections. For the purposes of the present invention, the term "two different cross sections" refers to cross sections which have the same geometry and different areas or different geometries and the same or different areas.

If, in the context of the present invention, an internal, helically formed tube has two or more cross sections being different from each other, the transitions from a region of the tube having one cross section to another region of the tube having a different cross section can be continuous and thus without edges or can be discontinuous. These transitions are preferably made continuous so as to produce no dead zones in the tube when a reaction solution flows through it.

The present invention also comprises embodiments, wherein the at least one internal tube has a noncircular cross section and a helical configuration in at least one section surrounded by the shell and a circular cross section or a noncircular cross section and a configuration other than a helical configuration in at least one other section. In this case, the noncircular cross section in the at least one region which does not have a helical configuration and the noncircular cross section in the at least one region having a helical configuration can be identical to or different from one another.

Furthermore, the present invention also comprises embodiments in which the at least one internal tube has two or more different helical sections having a noncircular cross section. These sections can either have a continuous or discontinuous, preferably continuous, transition between them or can be separated from one another by at least one section having a nonhelical circular or noncircular cross section, wherein the transitions are continuous or discontinuous, preferably continuous. In the context of the present invention, the term "different helical sections" refers to sections which differ in the length of the tube, which has a helical configuration in the respective section and/or in the length of the at least one axis around which the tube is twisted in the respective section and/or in the at least one geometry and/or area of the respective noncircular cross section and/or in the number of helical turns and/or in the position and/or number of the axes around which the internal tube is twisted in the respective section.

If two or more internal tubes are located within the shell, the present invention comprises embodiments in which at least one section of at least one tube has a noncircular cross section and a helical configuration. The present invention accordingly comprises an embodiment in which all the internal tubes located within the shell have a noncircular cross section and a helical configuration in at least one section, wherein the internal tubes can be identical or different from one another in this case. If the tubes are different from one another, they can differ, for example, in the number of helical and/or nonhelically formed regions having a circular or noncircular cross section and/or in the length of the tube in the helical and/or nonhelically formed regions and/or in the number of helical turns in the respective sections and/or the arrangement of the helical sections relative to the shell and/or in the cross-sectional areas of the helical and/or nonhelically formed regions having a circular or noncircular cross section or in the cross-sectional geometries of the helical or nonhelical regions having a noncircular cross section and/or in the position and/or number of the axes around which the internal tube is twisted in the respective helically formed section with a circular or noncircular cross section.

The present invention likewise comprises embodiments, wherein at least one tube in at least one section has a noncircular cross section and a helical configuration and at least one internal tube does not have a helical configuration in any part of it or has a circular cross section in each region present which has a helical configuration.

According to a preferred embodiment of the present invention, all the internal tubes located within the shell have at least one section which is surrounded by the shell and has a helical configuration and a noncircular cross section. More preferably, all the internal tubes located within the shell are essentially totally helical in the region in which they are surrounded by the shell and have a noncircular cross section in the helical region. Preference is furthermore given to an internal tube having a noncircular cross section which has the same geometry and the same area in all of the helical region.

Essentially all suitable geometries are possible for the noncircular cross section of the helical regions of the tube. Possible cross-sectional geometries are shown by way of example in FIGS. 2a to 2g.

Figure 2A:
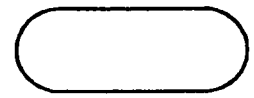
Figure 2B:
Figure 2C:
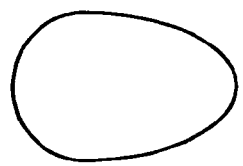
Figure 2D:
Figure 2E:
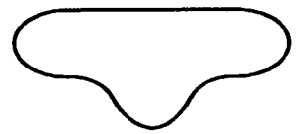
Figure 2F:
Figure 2G:
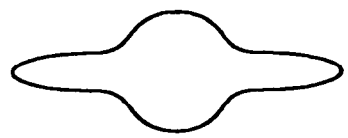

Particularly preferably are in this context cross sections according to FIGS. 2a to 2c.

The present invention accordingly relates to a process as described above, wherein the noncircular cross section has both mutually opposite straight sides and mutually opposite round sides or has the shape of an oval or the shape of an ellipse.

In case the cross section has both mutually opposite straight sides and mutually opposite round sides, as is shown by way of example in FIG. 2a, the length of the straight sides or the shape of the mutually opposite round sides or the cross-sectional area can in principle be chosen at will and, in particular, adapted to the requirements of the reaction for preparing the chemical compound. This basic freedom in respect of the precise configuration likewise applies to all further conceivable cross-sectional geometries and cross-sectional areas, in particular the preferred cross-sectional geometries and cross-sectional areas shown in FIGS. 2b to 2g or in FIGS. 2b and 2c.

While the number of helical turns of the internal tubes in the region which is surrounded by the shell can in principle be chosen at will, preference is given to embodiments, wherein the helix has a noncircular cross section in the region surrounded by the shell of from 1 to 2000, more preferably from 1 to 1000, more preferably from 1 to 750, more preferably from 2 to 500, more preferably from 5 to 400, more preferably from 10 to 300 and in particular from 20 to 250, complete turns.

The present invention accordingly provides a process as described above, wherein the helix has from 1 to 2000 complete turns in the region surrounded by the shell.

As already described above, the density of turns can remain identical or vary over the length of the tubes. Particular preferred are embodiments, according to which the density of turns is essentially constant over the total length of the helical section(s) of an internal tube.

When the internal tubes having a helical configuration are used, an advantage which, inter alia, has to be mentioned is that a twisted tube is able to expand or contract under thermal stress. Straight tubes which are used according to the prior art in shell-and-tube reactors for the continuous preparation of a chemical compound do not have this ability of working within themselves and, for example, to twist further or to expand further, and are accordingly subjected to increased mechanical stress and greater tension, respectively, compared to the twisted tubes used according to the invention.

The number of internal tubes can essentially be chosen at will and can, for example, be adapted to the type of the chemical reaction, the desired reaction parameters such as temperature and/or pressure and/or the desired conversions and/or selectivities.

In general, embodiments are preferred, wherein from 1 to 20 000, preferably from 10 to 10000, more preferably from 100 to 8000, more preferably from 1000 to 7000 and particularly preferably from 3000 to 6500 or from 3000 to 6000, internal tubes having a noncircular cross section are located in a helical configuration within the shell.

The present invention accordingly provides a process as described above, wherein from 1 to 20 000 internal tubes having a noncircular cross section are located in a helical configuration within the shell.

For the purposes of the present invention, particular preference is given to embodiments, wherein all the internal tubes have the same configuration.

In principle, the areas of the noncircular cross sections of the at least one internal tube having a helical configuration can in principle be chosen at will and, for example, adapted to the type of chemical reaction, the desired reaction parameters such as temperature and/or pressure and/or the desired conversions and/or selectivities.

In general, embodiments, wherein the cross-sectional area of the at least one internal tube is in the range of from 0.3 to 100 $cm^2$, preferably in the range of from 2 to 75 $cm^2$, more preferably in the range of from 3 to 50 $cm^2$, more preferably in the range of from 4 to 40 $cm^2$ and particularly preferably in the range of from 5 to 35 $cm^2$, are preferred. The cross-sectional area of the internal tube or tubes is more preferably in the range from 5.7 to 27 $cm^2$.

The term "cross-sectional area" as used in the context of the present invention means the free cross-sectional area of a tube or of the shell, wherein the wall thickness of this tube or of this shell is not taken into account.

Depending on, for example, the number and cross-sectional area of the at least one internal tube, embodiments are preferred, wherein the cross-sectional area of the shell is in the range of from 0.01 to 115 $m^2$, preferably in the range of from 0.02 to 75 $m^2$, more preferably in the range of from 0.07 to 60 $m^2$, more preferably in the range of from 0.2 to 50 $m^2$ and particularly preferably in the range of from 0.4 to 45 $m^2$.

The present invention accordingly provides a process as described above, wherein the cross-sectional area of the at least one internal tube is in the range of from 0.3 to 100 cm$^2$ and the cross-sectional area of the shell is in the range of from 0.01 to 115 m$^2$.

The ratio of the cross-sectional area of the shell and the sum of the cross-sectional areas of the internal tubes is preferably in the range from 2.0 to 3.0, more preferably from 2.1 to 2.9 and especially preferably from 2.2 to 2.7.

In principle, the length of the shell can be chosen at will and, for example, is particularly preferably adapted to the length of the internal tubes. In general, the shell has a length which allows all the helical regions of the internal tube or tubes to be surrounded by the shell. Very particularly preferably the shell and all internal tubes have the same length, which is preferably in the range of from 1 to 25 m, more preferably in the range of from 5 to 20 m, more preferably in the range of from 6 to 18 m and particularly preferably in the range of from 10 to 14 m.

The at least one internal tube can in principle be arranged in any desired way in the shell. Preference is given to embodiments, according to which the at least one internal tube is twisted around a linear axis in the helical region, wherein this axis more preferably runs parallel to the side wall of the shell. Further preferably all internal tubes are twisted around a linear axis, wherein particularly preferably each of these linear axes runs parallel to the side wall of the shell.

According to a particularly preferred embodiment of the present invention, the region in which the at least one internal tube is surrounded by the shell has a length in the range of from 1 to 25 m, more preferably in the range of from 5 to 20 m, more preferably in the range of from 6 to 18 m and particularly preferably in the range of from 10 to 14 m.

According to a further preferred embodiment of the present invention, the preferably cylindrical shell has a tube plate into which the at least one internal tube is welded at each of the end faces.

The internal tubes and the shell and also the tube plates can in principle be made of the same or different materials. The materials can be adapted, for example, to the desired thermal conductivities, the reactions which proceed in the internal tubes and/or the chemical nature of the heating or cooling media. According to particularly preferred embodiments, materials used are, for example, unalloyed steel such as steel 1.0425 and/or stainless steels such as stainless steel 1.4301, stainless steel 1.4306, stainless steel 1.4401, stainless steel 1.4404, stainless steel 1.4541 or stainless steel 1.4571. Very particular preference is given to using stainless steel 1.4541 as material.

The at least one opening in the tube plate through which the reaction medium is fed into the at least one internal tube can in principle have any geometry. For example, this at least one opening preferably has a cross section which corresponds to the noncircular cross section of the helical region of the internal tube. Particularly preferably, this at least one opening has a circular cross section. The circular cross section can directly be connected to the at least one helical region of the internal tube having a noncircular cross section, wherein the transition from the circular cross section to the noncircular cross section is continuous, thus free of corners and edges, or discontinuous. The transition is particularly preferably formed continuously. According to the present invention, particular preferably is an embodiment, wherein the circular opening connected to a section of the internal tube which likewise has this circular cross section and does not have a helical configuration. This section of the internal tube is followed by a continuous or discontinuous, preferably continuous transition of the circular cross section to the noncircular cross section according to the invention, wherein the helical region of the internal tube is directly connected to the nonhelical section, which has a circular cross section, or is connected to a nonhelical section, which has the noncircular cross section.

The above-described internal tubes can in principle be arranged in any desired way. Accordingly, it is possible, for example, for the reaction solution to flow through the internal tubes vertically from the bottom upward or vertically from the top downward. It is likewise possible for the internal tubes to be arranged nonvertically, i.e., for example horizontally. Oblique arrangements are likewise possible, wherein in the case of this oblique arrangement the reaction solution can flow through the internal tubes from the bottom upward or from the top downward. Particular preferred are embodiments, wherein the reactor and thus the at least one internal tube is arranged vertically and the reaction solution flows through the at least one tube from the top downward or from the bottom upward or in which the reactor and thus the at least one internal tube is arranged horizontally and the reaction solution flows through the at least one internal tube from the back forward or from the front backward.

According to a preferred embodiment, the internal tubes are arranged vertically, wherein the reaction solution more preferably flows through the internal tubes from the bottom upward.

According to a particularly preferred embodiment, at least one cooling medium or heating medium flows through the shell space, which is confined by the outsides of the internal tubes and by the inside of the shell and by the tube plates. The flow of this medium through the shell space can be effected in cocurrent with or in countercurrent to the reaction solution. Within this overall flow direction, the medium very particularly preferably flows against the internal tubes in a transverse direction.

In the processes for the continuous preparation of a chemical compound which are known from the prior art, this transverse flow is achieved essentially by the installation of deflection plates. These deflection plates by means of which this transverse flow can be achieved to some extent force the cooling medium or the heating medium to flow in a meandering fashion. This has been already described above and is shown by way of example in FIG. 3.

The internal tubes of the reactor which are used according to the invention which have a noncircular cross section for at least part of their length and in this at least one section have a helical configuration make it possible to achieve this transverse flow without the use of deflection plates or with a number of deflection plates which is much less than in the prior art and thus allow additional components in the reactor to be dispensed with or largely dispensed with. A further important advantage is that when the helical internal tubes according to the present invention are used instead of straight internal tubes with additional deflection plates, inhomogeneous flow no longer occurs. As a result, the above-described inevitable occurrence of dead zones is eliminated. A direct consequence of this elimination of the dead zones in the reactors according to the invention is that, as a result of the uniform distribution of the flow in the at least one internal tube, heat removal is also distributed uniformly and the heat of reaction can thus be removed uniformly from the tube. The undesirable local temperature peaks, known as hot spots, can therefore be avoided in the process according to the invention as a result of the use of the reactors according to the invention, compared to the processes and reactors of the prior art. It has surprisingly been found that the process according to the invention and the use of a reactor according to the invention enables selectivity improvements in the reaction occurring in the at least one internal tube to be achieved in comparison with the chemical reactors having straight tubes and a large number of deflection plates which are known from the prior art. Depending on the reaction, selectivity improvements of up to 10% or up to 20% are possible.

The present invention therefore also describes the use of a reactor as described above for improving the selectivity in the preparation of a chemical compound.

Figure 4:
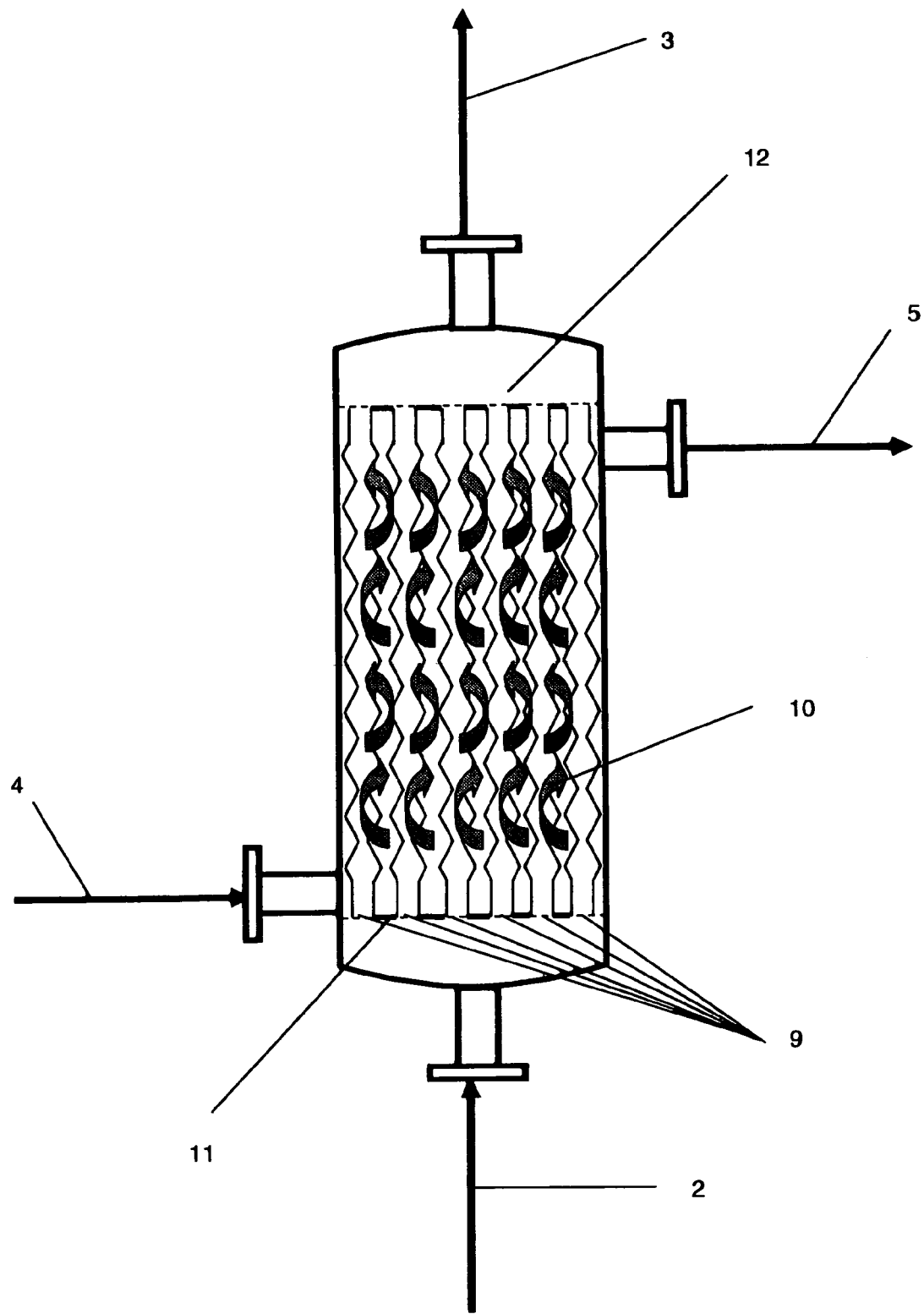

The principle of the reactor according to the invention for the continuous preparation of a chemical compound is depicted in FIG. 4.

While in a typical reactor, which is used, for example, according to the known prior art for the continuous epoxidation of an olefin, for example preferably the epoxidation of propene, it is generally necessary to install at least 5 deflection plates in order to achieve the desired transverse flow, according to the invention not more than 3 deflection plates, preferably, for example, no deflection plate or from 1 to 3 deflection plates, for example 1 deflection plate or 2 deflection plates or 3 deflection plates, is/are necessary.

The present invention accordingly describes a process as described above, wherein not more than 3 deflection plates, for example no deflection plate or from 1 to 3 deflection plates, are present in the at least one shell-and-tube reactor.

As already stated above, at least one cooling medium or at least one heating medium, depending on whether heat is to be removed or supplied during the course of the reaction which occurs in the at least one internal tube, can flow through the outer region. In principle, it is possible within the scope of the present invention to carry out an endothermic reaction in at least one internal tube and an exothermic reaction out in at least one further internal tube, wherein in such a case, for example, at least one heat transfer medium flows through the outer region and transfers the heat evolved in the at least one internal tube to the at least one other internal tube. The present invention likewise comprises embodiments of the continuous process, wherein a first endothermic reaction is carried out in at least one internal tube and a second endothermic reaction is carried out in at least one second internal tube and at least one heating medium flows through the outer region. The present invention likewise comprises embodiments of the continuous process, wherein a first exothermic reaction is carried out in at least one internal tube and a second exothermic reaction is carried out in at least one second internal tube and at least one cooling medium flows through the outer region.

Possible cooling media are, inter alia:

river water, brackish water and/or sea water, which can in each case, for example, preferably be taken from a river and/or lake and/or sea close to the chemical plant in which the reactor according to the invention and the process according to the invention are used and, after any necessary suitable removal of suspended material by filtration and/or sedimentation, can be used directly without further treatment for cooling the reactor.

Secondary cooling water which is preferably conveyed around a closed circuit is particularly useful for cooling purposes. This secondary cooling water is generally essentially deionized water, further preferably wherein at least one antifouling agent has been added to said deionized water. More preferably, this secondary cooling water circulates between the reactor according to the invention and, for example, a cooling tower. Further preferably the secondary cooling water is, for example, countercooled in at least one countercurrent heat exchanger by, for example, river water, brackish water and/or sea water.

Furthermore, it is possible within the scope of the present invention in case that the reaction occurring in the internal tubes of the reactor is an exothermic reaction to generate high-pressure steam, for example steam under a pressure of at least 40 bar, e.g. in the range of from 40 to 100 bar or of from 50 bar to 100 bar or of from 60 bar to 100 bar or of from 70 bar to 100 bar, in the shell space by evaporative cooling of water, particularly preferably essentially deionized water. In such a case, it is particularly preferred in the context of the present invention to pump cooling water into the shell space, so that heat removal occurs as a result of the vaporization of the water in the shell space.

For cooling at high temperatures such as temperatures in the range of from 100 to 300° C., it is possible to use oil such as Malotherm as cooling medium, or at high temperatures such as temperatures for example in the range of from 300 to 500° C., a salt melt, for example a eutectic mixture of sodium nitrite and potassium nitrate, can be used.

As possible heating media are, inter alia, for instance to be mentioned:

water having a sufficiently high temperature;

vapor, preferably water vapor (steam) under a pressure in the range of preferably from 4 to 70 bar or from 4 to 40 bar;

oils such as Malotherm, salt melts;

hot air which is, for example, preferably generated by means of at least one electric heater or indirectly by combustion of natural gas;

flue gas. Within the scope of this embodiment, the reactor according to the invention is heated directly by the offgas from the combustion of one or more organic compounds, for example natural gas. It is likewise conceivable, for example, to burn at least one suitable by-product of a process in which the reactor according to the invention or the process according to the invention is used and to heat the reactor with the resulting offgas so as to achieve an integrated process in this respect;

a detonating gas, wherein in this case the reactor according to the invention is heated directly by the offgas from the reaction of hydrogen and oxygen.

Preferably secondary cooling water is used as cooling medium and hot air as heating medium.

According to a further embodiment of the process according to the invention, a reaction solution flows through the shell space and at least one cooling medium and/or at least one heating medium flows through at least one of the internal tubes, preferably all the internal tubes. At least one cooling medium could be passed through some of the internal tubes and at least one heating medium could be passed through other internal tubes, if this is necessary for the chosen reaction while the reaction solution passes through the shell space.

According to an embodiment of the present invention which is described in detail below, in which an olefin is converted into an epoxide in the shell-and-tube reactor according to the invention, preferably an olefin is converted to an epoxide by reaction with a hydroperoxide, more preferably propene is converted to propylene oxide by reaction with a hydroperoxide and particularly preferably propene is converted to propylene oxide by reaction with hydrogen peroxide, secondary cooling water is passed through the shell space, whereas the cooling water has a temperature at the inlet of the shell space in the range of preferably from 20 to 70° C., more preferably from 25 to 65° C. and particularly preferably from 30 to 60° C.

In a preferred embodiment of the process according to the invention, a reaction solution is passed in parallel through all internal tubes and at least one heating medium or at least one cooling medium flows through the outer region. The reactor according to the invention is very particularly preferably used for carrying out an exothermic reaction, wherein at least one cooling medium flows through the outer region.

In the context of the present invention, the number of helical turns in the tube regions can more preferably be adapted to the reaction occurring in the reactor. If, for example, higher temperatures occur in one or more regions of the reactor than in other regions of the reactor during the passage of the reaction medium through the internal tubes, the number of helical turns of the internal tubes can be increased in these regions of higher temperature so as to increase the twisting of the tube in order to achieve better removal of the heat of reaction via the at least one cooling medium which preferably flows through the shell space.

This can be necessary, for example, if, according to one, inter alia, preferred embodiment of the present invention, the continuous preparation of the chemical compound is carried out in the presence of a catalyst which is installed as a fixed bed reactor in the at least one internal tube and which is, for example, in the form of a structured bed. In this embodiment, for example, a first zone of the internal tubes is charged with a bed of a first catalyst, forming the first catalyst component. A second zone of the internal tubes is subsequently produced by pouring a second catalyst which is different from the first onto the first compartment to form the second compartment. A third compartment or further compartments can be added in a similar fashion, wherein the catalyst used in the third or further compartments is one of the first two catalysts or is different from both the first two catalysts, respectively. This type of preparation will for the purposes of the present invention be referred to as a "structured bed".

According to a further embodiment two or more catalysts being different from each other can be physically separated inside the internal tubes by charging two or more different zones of the internal tube with different zeolite catalysts, respectively, and by separating the different zones from each other, by means of at least one mechanical separation device so as to physically separate the different zeolite catalysts. Accordingly, one or more identical or different separation devices can be provided between two zones. In case of three or more zones, the same or different separation devices can be provided for separating the different zones. Examples for mechanical separation devices are sieve plates such as sheet-metal sieve or mesh plates and ordered packing or knitted packing as used, for example, in distillation columns which are according to a particularly preferred embodiment according to the invention used, in case that the catalysts are used as shaped bodies. Thus, for example, if shaped catalyst bodies of a first geometry are used in a first zone, shaped catalyst bodies of a second geometry are used in a second zone and shaped catalyst bodies of a third geometry are used in a third zone, the sieve plates which are, for example, preferably used for separating the zones can differ in their mesh opening which can be adapted to the geometry of the respective moldings. Likewise, the materials of which the mechanical separation devices are made can differ from one another. Accordingly, the present invention also describes a process, as described above, wherein the catalysts being different from each other are physically separated by means of at least one mechanical separation device.

This structured bed or the physical separation described according to the further preferred embodiment has, as also described below for the example of specific catalysts, inter alia, in comparison with conventional processes in which a reactor is provided with only a single catalyst, the advantage that the specific selection and thus sequence of the catalysts used in various zones of the reactor enables a positive influence to be exerted on, for example, the conversion achieved in the reaction. For example, in the continuous reaction carried out according to the invention, the individual catalysts can be adapted to the progress of the reaction.

The shell in which the at least one internal tube is arranged can in principle have any geometry. Accordingly, it is possible according to the present invention to adapt the shell to the geometry of the at least one internal tube. In a particularly preferred embodiment of the present invention, at least one cooling medium or at least one heating medium, particularly preferably at least one cooling medium, flows through the space enclosed by the shell, in which the at least one helically formed internal tube is located. In these preferred embodiments, the geometry of the shell can be selected so that the desired cooling medium flow in respect of flow velocity and/or flow rate is achieved. Preference is generally given, according to the invention, to an embodiment in which the shell is positioned so close to, for example, the outer circle of the internal tubes that the flow velocity of the cooling medium or heating medium is in a range which makes the desired heat transfer possible.

The shell preferably has a cross section which has no corners and/or edges on the side facing the at least one internal tube. The cross section of the shell is particularly preferably circular on the side facing the at least one internal tube.

According to a further preferred embodiment of the present invention, the shell space in which the at least one helical internal tube is arranged has a cylindrical geometry.

The introduction of the at least one cooling medium or the at least one heating medium into the outer region of the shell-and-tube reactor according to the invention can in principle be adapted to the desired flow direction of the media. If, for example, according to a preferred embodiment, the internal tubes and the shell are arranged vertically, the at least one medium can, depending on the desired flow direction, be fed into the outer region either in the upper part of the reactor or in the lower part of the reactor and taken off from the outer region in the lower part of the reactor or in the upper part of the reactor. In a particularly preferred embodiment in which the internal tubes and the shell are arranged vertically and the reaction solution is passed from the bottom upward through the internal tubes, the at least one cooling medium or the at least one heating medium is fed into the outer region in the lower part of the reactor and taken off from the outer region in the upper part of the reactor. This preferred embodiment is shown schematically in FIG. 4.

Within the scope of the present invention, it is also possible, for example, to introduce the cooling medium or the heating medium in about the middle of the reactor and take it off both in the lower part of the reactor and in the upper part of the reactor.

According to a further embodiment according to the present invention, the shell space is divided into two, three or more zones. When, for example, the shell space is divided into two zones, the shell space can be divided in the case of, for example, a vertical reactor at half the height of the reactor or in the case of, for example, a horizontal reactor at half the length of the reactor, wherein other division ratios of the shell space are also possible.

In such a two-zone reactor, three-zone reactor or multizone reactor, a cooling medium or heating medium having a particular temperature in one zone is passed in countercurrent or in cocurrent through the zone. Each further zone can be operated using the same cooling or heating medium or a different cooling or heating medium at the same temperature or a different temperature, either in countercurrent or in cocurrent.

The at least one cooling medium and/or the at least one heating medium can be introduced into the at least one shell space zone via any suitable device. For example, a preferred device of this type is a flange made of a suitable material which is inert toward the respective medium at the chosen pressures and temperatures. This principle of introducing the at least one medium can likewise be applied to the discharge of the medium from the respective space within the shell.

According to a particularly preferred embodiment of the present invention, the reactor according to the invention is used for reactions which are carried out in the presence of at least one catalyst. This can in principle be a homogeneous and/or heterogeneous catalyst, wherein the heterogeneous catalyst can be applied as a suspended catalyst and/or fixed-bed catalyst. In a particularly preferred embodiment of the present invention, the reactor according to the invention is used for a continuous, heterogeneously catalyzed preparation of a chemical compound, wherein the at least one heterogeneous catalyst is particularly preferably applied as a fixed-bed catalyst.

The present invention accordingly describes a process as described above in which the chemical compound is prepared in the presence of a catalyst, wherein the catalyst is installed as a fixed bed in the at least one internal tube, which has a noncircular cross section and a helical configuration.

The present invention likewise provides a shell-and-tube reactor which comprises a shell and at least one internal tube located in the shell which has a noncircular cross section, wherein at least one of the internal tubes having the noncircular cross section has an at least partly helical configuration in the region in which it is surrounded by the shell, wherein at least one region of at least one of the internal tubes contains at least one fixed-bed catalyst.

Furthermore, the present invention relates to such a shell-and-tube reactor, wherein the shell-and-tube reactor contains not more than 3 deflection plates, preferably no deflection plate or likewise preferably from 1 to 3 deflection plates.

The process according to the invention and the shell-and-tube reactor according to the invention thus offer the advantage that the same heat transfer coefficients can be achieved despite the absence of deflection plates or despite the considerable, compared to the prior art, reduction in the number of deflection plates present in the reactor. Apart from the above-mentioned omission of additional components, as further advantage it has to be pointed out, that as a result of the small number of deflection plates the pressure drop in the shell space can be reduced by at least 40-60% compared to straight tubes with at least 5 deflection plates, which influences, inter alia, the pump capacity and in particular the capacity of the blower by means of which the cooling medium or heating medium are introduced into the shell space.

The internal tube can in principle contain the at least one fixed-bed catalyst in any region. The present invention accordingly comprises embodiments, wherein the fixed-bed catalyst is present in a nonhelically formed region of the tube and/or in an optionally helically formed region of the tube having a circular cross section and/or in a helically formed region of the tube having a noncircular cross section. The at least one fixed-bed catalyst or catalysts is/are particularly preferably present in at least one region of the tube which has a noncircular cross section and a helical configuration.

The present invention accordingly also relates to a shell-and-tube reactor as described above, wherein the shell-and-tube reactor contains in at least one helically formed region of the tube having a noncircular cross section at least one fixed-bed catalyst.

As regards the possible and preferred embodiments of the shell-and-tube reactor containing at least one fixed-bed catalyst in respect of the design of the internal tubes and the shell, reference may be made, for example, to the embodiments described in the context of the above-described process for the continuous preparation of a chemical compound.

According to a particularly preferred embodiment, the present invention relates to a vertically arranged shell-and-tube reactor for the continuous preparation of a chemical compound, which comprises a shell and at least one internal tube having a noncircular cross section located within the shell, wherein at least one of the internal tubes having the noncircular cross section is at least partly helical in the region in which it is surrounded by the shell and wherein at least one region of at least one of the internal tubes contains at least one fixed-bed catalyst, wherein the reactor has at least one inlet for introduction of a reaction solution and at least one inlet for the introduction of at least one cooling or heating medium in the lower part of the reactor and has at least one outlet for the reaction solution and at least one outlet for the at least one cooling or at least one heating medium in the upper part of the reactor.

If two or more different reaction solutions are fed into the reactor and/or two or more constituents of the reaction solution are introduced in two or more streams, the present invention also comprises embodiments of the reactor, wherein the reactor, preferably the vertically arranged reactor, has two or more inlets for the various reaction solutions and/or streams of the constituents of the reaction solution, preferably in the lower part of the reactor.

If two or more different cooling or heating media are fed into the reactor, the present invention also comprises embodiments of the reactor, wherein the rector, preferably the vertically arranged reactor, has two or more inlets for the various cooling or heating media, preferably in the lower part of the reactor.

The present invention therefore also relates to a shell-and-tube reactor for the continuous preparation of a chemical compound, comprising a shell and at least one internal tube having a noncircular cross section located within the shell, wherein at least one of the internal tubes having the noncircular cross section is at least partly helical in the region in which it is surrounded by the shell.

The present invention likewise relates to a shell-and-tube reactor as described above, wherein the noncircular cross section has both mutually opposite straight sides and mutually opposite round sides or has the shape of an oval or the shape of an ellipse.

The present invention also relates to a shell-and-tube reactor as defined above, wherein the helix has from 1 to 2000 complete turns in the region surrounded by the shell.

The present invention also relates to a shell-and-tube reactor as described above, wherein from 1 to 20 000 internal tubes having a noncircular cross section and a helical configuration are located within the shell.

According to more preferred embodiments of the shell-and-tube reactor according to the invention, reference is made to the embodiments described above in the context of the process according to the invention and described below.

All possible reactions can in principle be carried out in the reactor according to the invention or by the process according to the invention. In particular, the process and the reactor according to the present invention are suitable for reactions in which highly efficient heat transfer between a reaction solution and a cooling or heating medium is sought.

Examples of this large number of conceivable reactions are, inter alia, catalytic transformations of inorganic and/or organic compounds. Preferably organic compounds are prepared according to the invention, wherein catalyzed, particularly preferably heterogeneously catalyzed, reactions and more preferably reactions fixed beds catalyzed, are preferred.

According to particularly preferred embodiments, a zeolite catalyst, more preferably at least one fixed-bed zeolite catalyst, is used as at least one catalyst in the process according to the invention or in a reaction in the reactor according to the invention.

Reactions which can be carried out in the presence of at least one zeolite catalyst are, for example, oxidations, the epoxidation of olefins, for example the preparation of propylene oxide from propylene and $H_2O_2$, the hydroxylation of aromatics, for example the preparation of hydroquinone from phenol and $H_2O_2$ or cresol from toluene, the conversion of alkanes to alcohols, aldehydes and acids, isomerization reactions, for example the conversion of epoxides into aldehydes, and also further reactions described in the literature, in particular, reactions which use zeolite catalysts, as described, for example, in W. Hölderich, "Zeolites: Catalysts for the Synthesis of Organic Compounds", Elsevier, Stud. Surf. Sci. Catal., 49, Amsterdam (1989), pp. 69 to 93, and as described in particular for possible oxidation reactions in B. Notari in Stud. Surf. Sci. Catal., 37 (1987), pp. 413 to 425.

Zeolites are, as is known, crystalline aluminosilicates having ordered channel and cage structures and containing micropores which are preferably smaller than about 0.9 nm. The network of such zeolites is made up of $SiO_4$ and $AlO_4$ tetrahedra which are bound via shared oxygen bridges. An overview of the known structures may be found, for example, in W. M. Meier, D. H. Olson and Ch. Baerlocher, "Atlas of Zeolite Structure Types", Elsevier, 5th edition, Amsterdam 2001.

Zeolites, which do not contain aluminum and in which part of the Si(IV) in the silicate lattice is replaced by titanium as Ti(IV) are known as well. These titanium zeolites, in particular those having a crystal structure of the MFI type, and possible ways of preparing them are described, for example, in EP-A 0 311 983 or EP-A 0 405 978. Apart from silicon and titanium, such materials can further comprise additional elements such as aluminum, zirconium, tin, iron, cobalt, nickel, gallium, germanium, boron or small amounts of fluorine. In the zeolite catalysts which have preferably been regenerated by the process according to the invention, part or all of the titanium of the zeolite can be replaced by vanadium, zirconium, chromium or niobium or a mixture of two or more thereof. The molar ratio of titanium and/or vanadium, zirconium, chromium or niobium to the sum of silicon and titanium and/or vanadium and/or zirconium and/or chromium and/or niobium is generally in the range of from 0.01:1 to 0.1:1.

Titanium zeolites, in particular those having a crystal structure of the MFI type, and possible ways of preparing them are described, for example, in WO 98/55228, EP-A 0 311 983 or EP-A 0 405 978.

It is known that titanium zeolites having the MFI structure can be identified via a particular X-ray diffraction pattern and also via a lattice vibration band in the infrared (IR) region at about 960 $cm^{-1}$ and thus differ from alkali metal titanates or crystalline and amorphous $TiO_2$ phases.

Specific mention may be made of titanium-, germanium-, tellurium-, vanadium-, chromium-, niobium-, zirconium-containing zeolites having a pentasil zeolite structure, in particular the types which can be assigned X-ray-crystallographically to the ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESV, EUO, FAU, FER, GIS, GME, GOO, HEU, IFR, ISV, ITE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSV, WIE, WEN, YUG, ZON structures and also mixed structures of two or more of the above-mentioned structures. Furthermore, titanium-containing zeolites having the ITQ-4, SSZ-24, TTM-1, UTD-1, CIT-1 or CIT-5 structure are also conceivable for use in the process according to the invention. Further titanium-containing zeolites which may be mentioned are those having the ZSM-48 or ZSM-12 structure.

According to preferred embodiments, the zeolites discussed above are used, in particular, for the epoxidation of olefins, preferably olefins having from 2 to 8 carbon atoms, more preferably ethylene, propylene or butene, in particular propene, to form the corresponding olefin oxides.

The process according to the invention and the reactor according to the invention are particularly useful for the reaction of organic compounds with hydroperoxides. Examples which may be mentioned are:

the above-described epoxidation of olefins, e.g. the preparation of propene oxide from propene and $H_2O_2$ or from propene and mixtures which provide $H_2O_2$ in situ;

hydroxylations such as the hydroxylation of monocyclic, bicyclic or polycyclic aromatics to form monosubstituted, disubstituted or more highly substituted hydroxy aromatics, for example the reaction of phenol and $H_2O_2$ or of phenol and mixtures which provide $H_2O_2$ in situ to give hydroquinone;

formation of oximes from ketones in the presence of $H_2O_2$ or mixtures which provide $H_2O_2$ in situ and ammonia (ammonoximation), for example the preparation of cyclohexanone oxime from cyclohexanone;

the Baeyer-Villiger oxidation.

The process according to the invention and the reactor according to the invention are very particularly preferably used for the continuous preparation of an epoxide. This epoxide is more preferably prepared from an olefin in the presence of at least one zeolite catalyst.

Accordingly, the present invention therefore also relates to a process as described above in which an olefin is reacted with a hydroperoxide in the presence of at least one zeolite catalyst to form an epoxide in the reactor.

The present invention likewise provides for the use of a reactor as described above for reacting an olefin with a hydroperoxide in the presence of at least one zeolite catalyst to give an epoxide.

For the purposes of the present invention, preference is given to using Ti zeolites having an MFI structure, an MEL structure, an MFI/MEL mixed structure or an MWW structure. Further preference is given specifically to the Ti-containing zeolite catalysts which are generally referred to as "TS-1", "TS-2", "TS-3", and also Ti zeolites having a framework structure isomorphous with beta-zeolite. Very particular preference is given to using zeolite catalysts of the TS-1 structure and the Ti-MWW structure for the purposes of the present invention.

Examples of olefins which can be used according to the invention are, inter alia:

ethene, propene, 1-butene, 2-butene, isobutene, butadiene, pentenes, piperylene, hexenes, hexadienes, heptenes, octenes, diisobutene, trimethylpentene, nonenes, dodecene, tridecene, tetracosene to eicosene, tripropene and tetrapropene, polybutadienes, polyisobutenes, isoprenes, terpenes, geraniol, linalool, linalyl acetate, methylenecyclopropane, cyclopentene, cyclohexene, norbornene, cycloheptene, vinylcyclohexane, vinyloxirane, vinylcyclohexene, styrene, cyclooctene, cyclooctadiene, vinylnorbornene, indene, tetrahydroindene, methylstyrene, dicyclopentadiene, divinylbenzene, cyclododecene, cyclododecatriene, stilbene, diphenylbutadiene, vitamin A, beta-carotene, vinylidene fluoride, allyl halides, crotyl chloride, methallyl chloride, dichlorobutene, allyl alcohol, methallyl alcohol, butenols, butenediols, cyclopentenediols, pentenols, octadienols, tridecenols, unsaturated steroids, ethoxyethene, isoeugenol, anethol, unsaturated carboxylic acids such as acrylic acid, methacrylic acid, crotonic acid, maleic acid, vinylacetic acid, unsaturated fatty acids such as oleic acid, linoleic acid, palmitic acid, naturally occurring fats and oils.

In the process according to the invention, preference is given to using alkenes containing from 2 to 8 carbon atoms. Particular preference is given to reacting ethene, propene and butene. Very particular preference is given to reacting propene.

The present invention accordingly describes a process as described above in which propene is reacted with a hydroperoxide in the presence of at least one zeolite catalyst having a TS-1 structure and/or Ti-MWW structure to form propylene oxide in the reactor.

The present invention likewise describes the use of a reactor as described above for reacting propene with a hydroperoxide in the presence of a zeolite catalyst having a TS-1 structure and/or Ti-MWW structure to give propylene oxide.

In the context of the present invention, the term "hydroperoxide" refers to a compound of the general formula ROOH. Examples of hydroperoxides which can be used according to the invention are, inter alia, tert-butyl hydroperoxide, ethylbenzene hydroperoxide, tert-amyl hydroperoxide, cumene hydroperoxide, cyclohexyl hydroperoxide, methylcyclohexyl hydroperoxide, tetrahydronaphthalene hydroperoxide, isobutylbenzene hydroperoxide, ethylnaphthalene hydroperoxide, peracids such as peracetic acid and hydrogen peroxide. Mixtures of two or more hydroperoxides can also be used according to the invention. For the purposes of the present invention, preference is given to using hydrogen peroxide as hydroperoxide, more preferably an aqueous hydrogen peroxide solution.

To prepare the hydrogen peroxide which is preferably used, it is possible to employ, for example, the anthraquinone process by means of which virtually the entire world production of hydrogen peroxide is produced. An overview of the anthraquinone process is given in "Ullmann's Encyclopedia of Industrial Chemistry", 5th edition, volume 13, pages 447 to 456.

It is likewise conceivable to obtain hydrogen peroxide by converting sulfuric acid into peroxodisulfuric acid by anodic oxidation with simultaneous evolution of hydrogen at the cathode. Hydrolysis of the peroxodisulfuric acid then leads via peroxomonosulfuric acid to hydrogen peroxide and sulfuric acid which is thus obtained back.

Of course, the preparation of hydrogen peroxide from the elements is also possible.

Before hydrogen peroxide is used in the process according to the invention, it is possible to free, for example, a commercially available hydrogen peroxide solution of undesirable ions. Conceivable methods are, inter alia, those described, for example, in WO 98/54086, DE-A 42 22 109 or WO 92/06918. It is likewise possible to remove at least one salt present in the hydrogen peroxide solution from the hydrogen peroxide solution by means of ion exchange in an apparatus which contains at least one nonacidic ion exchanger bed having a flow cross-sectional area F and a height H which are such that the height H of the ion exchanger bed is less than or equal to $2.5 \cdot F^{1/2}$, in particular less than or equal to $1.5 \cdot F^{1/2}$. For the purposes of the present invention, it is in principle possible to use all nonacidic ion exchanger beds comprising cation exchangers and/or anion exchangers. It is also possible for cation and anion exchangers to be used as mixed beds within one ion exchanger bed. In a preferred embodiment of the present invention, only one type of nonacidic ion exchangers is used. Further preference is given to the use of basic ion exchange, particularly preferably that of a basic anion exchanger and more particularly preferably that of a weakly basic anion exchanger.

The process according to the invention is particularly preferably carried out in the presence of at least one solvent. Particularly preferred solvents are, for example,
water;
alcohols, preferably alcohols having fewer than 6 carbon atoms, more preferably methanol, ethanol, propanols, butanols, pentanols;
diols or polyols, preferably those having fewer than 6 carbon atoms;
ethers such as diethyl ether, tetrahydrofuran, dioxane, 1,2-diethoxyethane, 2-methoxyethanol;
esters such as methyl acetate or butyrolactone;
amides such as dimethylformamide, dimethylacetamide, N-methyl-pyrrolidone;
ketones such as acetone;
nitrites such as acetonitrile;
or mixtures of two or more of the compounds mentioned, for example a mixture of at least two alcohols, e.g. methanol and ethanol, or a mixture of at least one alcohol and water, e.g. methanol and water or ethanol and water or methanol, ethanol and water, or, for example, a mixture of acetonitrile and water.

Very particular preference is given to using methanol or water or a mixture of water and methanol as solvent in the process according to the invention. In an especially preferred embodiment, these solvents are used in combination with a zeolite catalyst having the TS-1 structure.

According to a likewise very particularly preferred embodiment of the process according to the invention, acetonitrile or water or a mixture of acetonitrile and water is used as solvent. In an especially preferred embodiment, this solvent is used in combination with a zeolite catalyst having the Ti-MWW structure.

The present invention accordingly describes a process as described above wherein propene is reacted with hydrogen peroxide in the presence of at least one zeolite catalyst having the TS-1 structure and methanol or water or a mixture of water and methanol as solvent or a zeolite catalyst having the Ti-MWW structure and acetonitrile or water or a mixture of water and acetonitrile as solvent to form propylene oxide in the reactor.

The present invention likewise describes the use of a reactor as described above for the reaction of propene with hydrogen peroxide in the presence of a zeolite catalyst having the TS-1 structure and methanol or water or a mixture of water and methanol as solvent or a zeolite catalyst having the Ti-MWW structure and acetonitrile or water or a mixture of acetonitrile and water as solvent to give propylene oxide.

In a further embodiment of the process according to the invention, the fixed-bed catalyst, more preferably the fixed-bed zeolite catalyst and in particular the fixed-bed titanium zeolite catalyst, which is preferably present in the shell-and-tube reactor according to the invention is regenerated after use by a process in which the regeneration is effected by targeted burning-off of the deposits responsible for deactivation. This is preferably carried out in an inert gas atmosphere containing precisely defined amounts of substances which supply oxygen. Such a regeneration process is described, inter alia, in WO 98/55228 and DE 197 23 949 A1. In the context of the process according to the invention, the catalyst particularly preferably remains in the reactor during the regeneration.

After the regeneration, the activity and/or the selectivity of the catalyst are increased compared to the condition immediately before regeneration. The catalyst preferably displays its original activity and/or its original selectivity after regeneration.

The preferred zeolite catalyst according to the present invention which is to be regenerated is heated to a temperature in the range of from 250° C. to 800° C., preferably of from 400° C. to 550° C. and in particular of from 450° C. to 500° C., in an atmosphere containing from 0.1 to about 20 parts by volume of substances which supply oxygen, particularly preferably from 0.1 to 9 parts by volume of oxygen and very particularly preferably from 0.1 to 6 parts by volume of oxygen, either in the shell-and-tube reactor or in an external furnace, preferably in the shell-and-tube reactor according to the invention. Heating is preferably carried out at a heating rate of from 0.1° C./min to 20° C./min, preferably of from 0.2° C./min to 15° C./min and in particular of from 0.3° C./min to 10° C./min. The catalyst is preferably regenerated in the shell-and-tube reactor.

During this heating phase, the catalyst is heated up to a temperature at which the usually organic deposits present on it begin to decompose, while at the same time the temperature is regulated via the oxygen content and thus does not increase to such an extent that damage to the catalyst structure and/or to the reactor occurs. The slow increase in the temperature or the residence at a low temperature as a result of setting the appropriate oxygen content and the appropriate heating power is an essential step for preventing local overheating of the catalyst at high organic loadings on the catalyst to be regenerated.

If the temperature of the offgas stream at the reactor outlet drops despite increasing amounts of substances which supply oxygen in the gas stream, the burning-off of the organic deposits is complete. The duration of the treatment is generally from 1 to 30 hours, preferably from about 2 to about 20 hours and in particular from about 3 to about 10 hours.

The subsequent cooling of the regenerated catalyst is preferably not carried out too quickly, since otherwise the mechanical strength of the catalyst and/or the reactor can be adversely affected. Cooling is carried out using a temperature ramp similar to that employed for heating.

It may be necessary to rinse the catalyst with water and/or dilute acids such as hydrochloric acid after it has been regenerated by calcination as described above in order to remove any remaining inorganic components present on the catalyst as a result of contamination of the starting materials. repeated drying and/or repeated calcination of the catalyst, preferably in the shell-and-tube reactor, can subsequently be carried out.

In another embodiment of the process according to the invention, the at least partly deactivated catalyst is washed with a solvent in the shell-and-tube reactor or in an external reactor, preferably in the shell-and-tube reactor, to remove adhering product of value before heating for the regeneration procedure. The washing is carried out in such a way that the products of value adhering to the catalyst can be removed therefrom but temperature and pressure are not so high that the mostly organic deposits are likewise removed. The catalyst is preferably merely rinsed with a suitable solvent. Thus, all solvents in which the respective reaction product dissolves readily are suitable for this washing process. The amount of solvent used and the duration of the washing process are not critical. The washing process can be repeated several times and can be carried out at elevated temperature. When $CO_2$ is used as solvent, supercritical pressure is preferred, but otherwise the washing process can be carried out under atmospheric pressure or super-atmospheric pressure or supercritical pressure. After the washing process is complete, the catalyst is generally dried. Although the way in which drying is carried out is generally not critical, the drying temperature should not be too far above the boiling point of the solvent used for washing in order to avoid sudden vaporization of the solvent in the pores, in particular the micropores, since this, too, can lead to damage to the catalyst.

The process according to the invention can be carried out in one or more stages, with a chemical compound being prepared continuously in at least one shell-and-tube reactor comprising a shell and at least one internal tube located within the shell, with at least part of at least one of the internal tubes having a noncircular cross section and a helical configuration in the region in which it is surrounded by the shell, in at least one process stage. The compound prepared continuously according to the invention can be the end product of the process or an intermediate in the process which is processed further either immediately or later.

If the process according to the invention is carried out in one stage, the present invention comprises embodiments in which one or more of the above-described reactors is/are used. If two or more of the reactors are used, it is possible, for example, for at least two of these reactors to be connected in parallel.

Particularly in the case of the preferred preparation of an epoxide, particularly preferably propylene oxide, the reaction of an olefin, particularly preferably of propene, can be carried out in one or more stages.

If this preferred process is carried out in a single stage, the reaction in the reactor or reactors of the reaction stage is preferably followed by at least one separation stage in which the at least one desired product is separated off from the reaction solution which is discharged from the reactor. Such desired products are, in the case of the preferred preparation of an epoxide, for example the epoxide, the unreacted olefin, the at least one solvent or at least one by-product formed during the reaction. According to more preferred embodiments of the process according to the invention, at least one of the desired products which has been separated off, for example the at least one solvent and/or unreacted olefin, is recirculated to the reaction stage.

If, for example, a homogeneous catalyst or a heterogeneous suspended catalyst is used in the reaction stage, the present invention comprises embodiments in which the catalyst is separated off from the reaction solution which is discharged from the reactor, if necessary regenerated in a suitable manner and recirculated to the reaction stage.

The present invention therefore also relates to an apparatus for the continuous preparation of a chemical compound, which comprises at least one reactor and at least one separation device wherein at least one of the reactors is a shell-andtube reactor comprising a shell and at least one internal tube having a noncircular cross section located within the shell, wherein at least one of the internal tubes having the noncircular cross section is at least partly helical in the region in which it is surrounded by the shell.

An example of a preferred separation device is, inter alia, at least one distillation column. Preferred distillation columns are, for example, dividing wall columns in which, depending on the chemical nature of the constituents of the reaction solution which leaves the reactor in which the reaction is carried out, constituents of the reaction solution are separated off at the bottom, via at least one side offtake and/or at the top.

According to a particularly preferred embodiment of the process according to the invention, an olefin, preferably propene, is reacted with a hydroperoxide, preferably hydrogen peroxide, in the reaction stage to give a mixture (M0). In this reaction stage, very particular preference is given to using a fixed-bed zeolite catalyst of the TS-1 structure and preference is also given to using methanol as solvent.

In the apparatus according to the invention comprising the reactor according to the invention and the separation device, the unreacted olefin, preferably propene, is separated off from this mixture (M0) comprising epoxide, preferably propylene oxide, unreacted olefin, preferably propene, and methanol.

The present invention therefore also provides a process as described above comprising the steps (i) and (ii):
(i) continuous reaction of an olefin with a hydroperoxide to give a mixture (M0) comprising epoxide and unreacted olefin;
(ii) separation of the unreacted olefin from the mixture (M0) to give a mixture (M1) comprising epoxide, where step (i) is carried out using at least one shell-and-tube reactor comprising a shell and at least one internal tube located within the shell, wherein at least part of one of the internal tubes has a noncircular cross section and a helical configuration in the region in which it is surrounded by the shell.

According to a preferred embodiment, the mixture (M0) further comprises unreacted hydroperoxide. In a more preferred embodiment, the epoxide is also separated off from the mixture (M0).

As described above, the unreacted olefin which has been separated off in stage (ii) can, according to the invention, be recirculated to stage (i). In a more preferred embodiment of the process according to the invention, the separation stage (ii) is followed by at least one second reaction stage (iii) into which the unreacted olefin which has been separated off in stage (ii) is fed.

The present invention accordingly describes a process as described above comprising the stages (i) to (iii)
(i) reaction of the olefin with hydroperoxide to give a mixture comprising epoxide and unreacted olefin,
(ii) separation of the unreacted olefin from the mixture resulting from stage (i),
(iii) reaction of the olefin which has been separated off in stage (ii) with hydroperoxide, wherein the reaction of the olefin in at least one of the stages (i) and (iii) is carried out using at least one shell-and-tube reactor comprising a shell and at least one internal tube located within the shell, where at least part of at least one of the internal tubes has a noncircular cross section and a helical configuration in the region in which it is surrounded by the shell.

According to a particularly preferred embodiment, the olefin which has been separated off is firstly worked up after the separation and subsequently reacted in (iii).

According to another preferred embodiment, exclusively fresh olefin or fresh olefin in addition to the olefin which has been separated off is reacted in (iii).

According to another preferred embodiment, the hydroperoxide which has not been reacted in (i) is used as hydroperoxide in (iii).

The olefin used is particularly preferably propene and, furthermore, the hydroperoxide used is particularly preferably hydrogen peroxide.

The reactors used in the stages (i) and (iii) are preferably fixed-bed reactors. e is given to using A titanium silicalite catalyst of the structure Ti-TS1 I very particularly preferably used as catalyst in these fixed-bed reactors. In a likewise preferred embodiment, a zeolite catalyst of the structure Ti-MWW is used as catalyst.

The present invention accordingly describes a process as described above comprising the stages (i) to (iii)
(i) reaction of the olefin with hydroperoxide in the presence of a titanium zeolite fixed-bed catalyst of the structure Ti-TS1 and/or Ti-MWW to give a mixture comprising epoxide and unreacted olefin and preferably unreacted hydroperoxide,
(ii) separation of the unreacted olefin and preferably epoxide from the mixture resulting from stage (i),
(iii) reaction of the olefin which has been separated off in stage (ii) and preferably worked up and/or of fresh olefin with hydroperoxide, preferably with hydroperoxide which has not been reacted in (i), in the presence of a titanium zeolite fixed-bed catalyst of the structure Ti-TS1 and/or Ti-MWW,
wherein in at least one of the stages (i) and (iii) at least one shell-and-tube reactor is employed for the reaction of the olefin, wherein the at least one shell-and-tube reactor comprises a shell and at least one internal tube located within the shell, wherein at least part of at least one of the internal tubes has a noncircular cross section and a helical configuration in the region in which it is surrounded by the shell.

According to a more preferred embodiment, the present invention describes a process as described above comprising the stages (i) to (iii) and additionally comprising the stage (iv)
(i) reaction of the olefin with hydroperoxide in the presence of a titanium zeolite fixed-bed catalyst of the structure Ti-TS1 and/or Ti-MWW to give a mixture comprising epoxide and unreacted olefin,
(ii) separation of the unreacted olefin from the mixture resulting from stage (i),
(iii) reaction of the olefin which has been separated off in stage (ii) and preferably worked up and/or of fresh olefin with hydroperoxide, preferably with hydroperoxide which has not been reacted in (i), in the presence of a titanium zeolite fixed-bed catalyst of the structure Ti-TS1 and/or Ti-MWW,
(iv) regeneration of the titanium zeolite fixed-bed catalyst of the structure Ti-TS1 and/or Ti-MWW used in stage (i) and/or stage (iii), wherein in at least one of the stages (i) and (iii), preferably stage (i) at least one shell-and-tube reactor is employed for the reaction of the olefin, wherein the at least one shell-and-tube reactor contains the titanium zeolite fixed-bed catalyst of the structure Ti-TS1 and/or Ti-MWW and comprises a shell and at least one internal tube located within the shell, wherein at least part of at least one of the internal tubes has a noncircular cross section and a helical configuration in the region in which it is surrounded by the shell, wherein the fixed-bed catalyst is regenerated in the at least one shell-and-tube reactor.

According to a preferred embodiment, the continuous process according to the invention is not interrupted during regeneration of the catalyst, which leads to an increased process throughput. According to the invention, this is achieved by the use of at least two reactors which are connected in parallel and can be operated alternately. The at least two reactors connected in parallel are particularly preferably shell-and-tube reactors according to the invention. In the process according to the invention, particular preference is given to at least two, more preferably at least three and particularly preferably three or four, shell-and-tube reactors according to the invention being connected in parallel.

To regenerate the catalyst, it is possible to disconnect at least one of the reactors connected in parallel from the respective reaction stage and to regenerate the catalyst present in this reactor, wherein at least one reactor is always available for reaction of the starting material or starting materials in every stage during the course of the continuous process.

Accordingly, the present invention therefore also describes an assembly of at least two, preferably three or four, shell-and-tube reactors according to the invention connected in parallel, each comprising a shell and at least one internal tube having a noncircular cross section located within the shell, wherein at least one of the internal tubes having the noncircular cross section is at least partly helical in the region in which it is surrounded by the shell and at least one region of at least one of the internal tubes contains at least one fixed-bed catalyst.

The present invention likewise describes an apparatus as described above for the continuous preparation of a chemical compound, which comprises at least two, preferably three or four, reactors connected in parallel and at least one separation device, wherein the reactors connected in parallel are shell-and-tube reactors comprising a shell and at least one internal tube having a noncircular cross section located within the shell, wherein at least one of the internal tubes having the noncircular cross section is at least partly helical in the region in which it is surrounded by the shell.

In the above-described regeneration of the fixed-bed catalyst in a shell-and-tube reactor according to the invention, at least one heating medium is, according to a preferred embodiment of the process according to the invention, passed through the shell space in order to heat the reactor. Particular preference is given, for example, to hot air having a temperature in the range of preferably from 50 to 550° C. as heating medium.

Accordingly, the present invention also describes a process as described above, wherein the at least one cooling medium flows through the shell space of at least one of the shell-and-tube reactors according to the present invention used in at least one process stage while the preparative process is being carried out in the reactor and at least one heating medium flows through it when carrying out the regeneration of the catalyst in the reactor.

According to the invention, the at least one reactor according to the invention can be used in stage (i) or in stage (iii) or in both stages (i) and (iii).

If the reactor according to the invention is not used in one of stages (i) and (iii), it is possible to use, for example, at least one tube reactor or at least one shell-and-tube reactor or at least one stirred vessel or at least one cascade of stirred vessels or at least one shaft reactor, as are known from the prior art, in this stage. If a reactor known from the prior art is used in one of the stages (i) and (iii), this can be configured as a fixed-bed reactor or a suspension reactor. Preferably a fixed-bed reactor and further preferably a fixed-bed shaft reactor is used.

If at least one of the reactors according to the invention is used in both stages, respectively, the at least one reactor used in stage (i) can be identical or different from the at least one reactor used in stage (iii). The differences can, for example, be any differences described above in respect of configuration, number and/or arrangement of the internal tubes and/or of the shell of these reactors. Furthermore, the reactor according to the invention used in stage (i) or (iii) can be operated isothermally and the reactor according to the invention used in stage (iii) or (i) can be operated adiabatically.

In the process according to the invention, particular preference is given to using at least one, preferably at least two and more preferably three or four, shell-and-tube reactors according to the invention in stage (i) and at least one shaft reactor in stage (iii). Further preference is given to the at least one reactor in stage (i) being operated isothermally and the at least one reactor in stage (iii) being operated adiabatically.

The present invention accordingly describes an apparatus for the continuous preparation of a chemical compound comprising at least one, preferably at least two and particularly preferably at least three or four, shell-and-tube reactors which are connected in parallel and each comprising a shell and at least one internal tube having a noncircular cross section located within the shell, wherein at least one of the internal tubes having the noncircular cross section is at least partly helical in the region in which it is surrounded by the shell, further comprising a distillation column located downstream of this at least one shell-and-tube reactor and at least one shaft reactor located downstream of the distillation column.

According to a particularly preferred embodiment of the process according to the invention, at least one isothermal shell-and-tube reactor according to the invention is used in stage (i) and at least one adiabatic shaft reactor is used in stage (iii).

The above-described two-stage process according to the invention with separation stage for the continuous preparation of propylene oxide from propene is particularly preferably carried out using hydrogen peroxide as hydroperoxide, methanol as solvent and a titanium silicalite catalyst as fixed-bed catalyst.

In stage (i), this process is preferably carried out at temperatures in the range of from 20 to 80° C., more preferably in the range of from 25 to 70° C. and particularly preferably in the range of from 30 to 60° C.

The pressure selected is preferably in the range of from 10 to 30 bar, more preferably in the range of from 15 to 28 bar and particularly preferably in the range from 18 to 25 bar.

The reactor used is a shell-and-tube reactor according to the invention which preferably has a length in the range of from 5 to 20 m, more preferably in the range of from 6 to 18 m and particularly preferably in the range of from 10 to 14 m. The number of internal tubes of the reactor is preferably in the range of from 10 to 10 000, more preferably in the range of from 100 to 7500 and particularly preferably in the range of from 3000 to 6500 or of from 3000 to 6000. The cross-sectional area of the internal tubes is preferably in the range of from 0.3 to 100 $cm^2$, more preferably in the range of from 3 to 50 $cm^2$ and particularly preferably in the range of from 5.7 to 27 $cm^2$.

The selectivity of this reaction in stage (i) in respect of hydroperoxide is preferably in the range of from 80 to 99%, more preferably in the range of from 90 to 98% and particularly preferably in the range of from 92 to 97%.

In stage (iii), the process is preferably carried out at temperatures in the range of from 15 to 80° C., more preferably in the range from of 20 to 70° C. and particularly preferably in the range of from 25 to 60° C.

The pressure selected is preferably in the range of from 5 to 30 bar, more preferably in the range of from 6 to 20 bar and particularly preferably in the range of from 8 to 15 bar.

The reactor used is for example a shell-and-tube reactor according to the invention which preferably has a length in the range of from 5 to 20 m, more preferably in the range of from 6 to 18 m and particularly preferably in the range of from 10 to 14 m. The number of internal tubes of the reactor is preferably in the range of from 10 to 10 000, more preferably in the range of from 100 to 7500 and particularly preferably in the range of from 3000 to 6500 or of from 3000 to 6000. The cross-sectional area of the internal tubes is preferably in the range of from 0.3 to 100 $cm^2$, more preferably in the range of from 3 to 50 $cm^2$ and particularly preferably in the range of from 5.7 to 27 $cm^2$.

In stage (iii), particular preference is given to using a shaft reactor, more preferably a continuously operated shaft reactor and particularly preferably a continuously operated, isothermal shaft reactor.

The selectivity of this reaction in stage (iii) in respect of hydroperoxide is preferably in the range of from 64 to 99%, more preferably in the range of from 72 to 90% and particularly preferably in the range of from 75 to 87%.

The selectivity of the overall process in respect of hydroperoxide is preferably in the range of from 78 to 99%, more preferably in the range of from 88 to 97% and particularly preferably in the range of from 90 to 96%.

The total hydroperoxide conversion is preferably at least 99.5%, more preferably at least 99.6%, more preferably at least 99.7% and particularly preferably at least 99.8%.

In comparison with the two-stage processes known from the prior art for the preparation of propylene oxide, the process according to the invention is characterized by, inter alia, the realization of a significant increase in selectivity, wherein the selectivity in the process according to the invention is generally at least 1% higher, preferably at least 1.5% higher, than the selectivities known from the prior art.

The present invention accordingly provides a process as described above, wherein the selectivity of the reaction is in the range from 90 to 96%, based on hydroperoxide.

Quite generally, the present invention therefore also relates to the use of the shell-and-tube reactor according to the invention for increasing the selectivity in the continuous preparation of a chemical compound, in particular an epoxide from an olefin and a hydroperoxide, more preferably propylene oxide from propene and hydrogen peroxide and particularly preferably propylene oxide from propene and hydrogen peroxide in the presence of a titanium zeolite catalyst in methanol as solvent.

As already described above in general terms, the shell-and-tube reactor according to the invention when used as fixed-bed reactor can contain at least two different fixed-bed catalysts, for example preferably two different zeolitic catalysts. The present invention accordingly describes, in particular, a process as described above for the continuous preparation of an epoxide in at least one reactor as described above using at least two different zeolite catalysts, wherein at least two of the different zeolite catalysts are used in physically separate locations. The two or more different zeolite catalysts are particularly preferably titanium zeolite catalysts which differ, for example, in the titanium content or in the zeolite structure or both in the titanium content and in the zeolite structure. The two different catalysts are more preferably a titanium zeolite catalyst of the crystal structure type MWW and a titanium zeolite catalyst of the crystal structure type MFI.

The term "physically separate" as used in the context of the present invention refers to embodiments in which the apparatus in which the reaction is carried out has at least two compartments, wherein one contains a zeolite catalyst and at least one other compartment contains at least one further zeolite catalyst being different from the zeolite catalyst present in the first compartment. Such compartmentalization is preferably achieved in a single reactor, with various embodiments of the compartmentalization also being possible. Thus, the compartmentalization in the reactor can be achieved, for example, by providing two or more different zones of the reactor with different zeolite catalysts. Here, the different zones of the reactor can in each case be separated from one another by means of at least one mechanical separation device to achieve physical separation of the different zeolite catalysts. Accordingly, one or more identical or different mechanical separation devices can be provided between two zones. In the case of three or more zones, identical or different separation devices can be provided for separating the various zones. The compartmentalization according to the invention in the only reactor can also be achieved without additional mechanical separation devices. This is possible, for example, by means of a specific configuration of the interior wall or walls of the reactor which have, for example, spaced depressions, recesses or similar structures in which the different catalysts can be accommodated. The compartmentalization is preferably achieved by the individual compartments containing the different zeolite catalysts adjoining one another directly without a spacing between the different zeolite catalysts. It is thus possible to equip the reactor with a first zeolite catalyst in a first zone and with a second zeolite catalyst which differs from the first zeolite catalyst in a directly adjacent second zone, with the two catalyst zones having one or more shared interfaces. At the interface between the two zones, mixing of the two different zeolite catalysts can take place as long as it is ensured that there is an inhomogeneity in the zeolite catalyst distribution over the two zones. In a particularly preferred embodiment, this is achieved, for example, by means of a structured bed of various catalysts. A first zone of the reactor is equipped with a first zeolite catalyst by pouring it into the reactor, thus producing the first catalyst compartment. A second zone of the reactor is subsequently produced by pouring the second zeolite catalyst, which is different from the first, onto the first compartment to form the second compartment. A third compartment or further compartments can be added in a similar fashion, wherein with one of the first two zeolite catalysts or a zeolite catalyst different from the first two catalysts is used in the third compartment or a further compartment. For the purposes of the present invention, this form of catalyst bed is referred to as a "structured bed".

Compared to conventional processes in which a reactor is provided with only a single zeolite catalyst, this structured bed offers the advantage that the targeted selection and thus sequence of the catalysts used in various reactor zones enables, for example, a positive influence to be exerted on the conversion rate of the reaction. For example, in a continuous reaction, wherein the reactants hydroperoxide and organic compound are passed through the reactor and travel through the various reactor zones containing the different zeolite catalysts, the individual catalysts can be adapted to the progress of the reaction.

The present invention is illustrated by the FIGS. 1 to 4 described below and the following examples.

FIG. 1a schematically shows a section of an internal tube of a shell-and-tube reactor according to the invention, in which the helical section of the tube is twisted around a linear axis (1). The line (1a) represents the projection of a cross section of the tube.

Figure 1B:
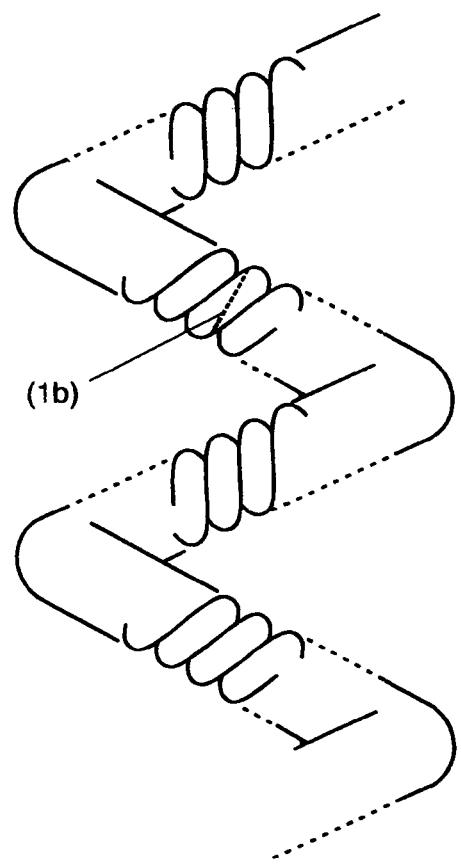

FIG. 1b schematically shows a section of an internal tube of a shell-and-tube reactor according to the invention, wherein the sections of this internal tube are twisted around linear axes and sections are twisted around nonlinear axes. The line (1b) represents the projection of a cross section in a section of the internal tube.

FIG. 2a schematically shows a noncircular cross section of an internal tube of a shell-and-tube reactor according to the invention which has both mutually opposite straight sides and mutually opposite round sides.

FIG. 2b schematically shows a noncircular cross section of an internal tube of a shell-and-tube reactor according to the invention which has an elliptical shape.

FIG. 2c schematically shows a noncircular cross section of an internal tube of a shell-and-tube reactor according to the invention which has an oval shape.

FIGS. 2d to 2g schematically show further noncircular cross sections of an internal tube of a shell-and-tube reactor according to the invention.

Figure 3:
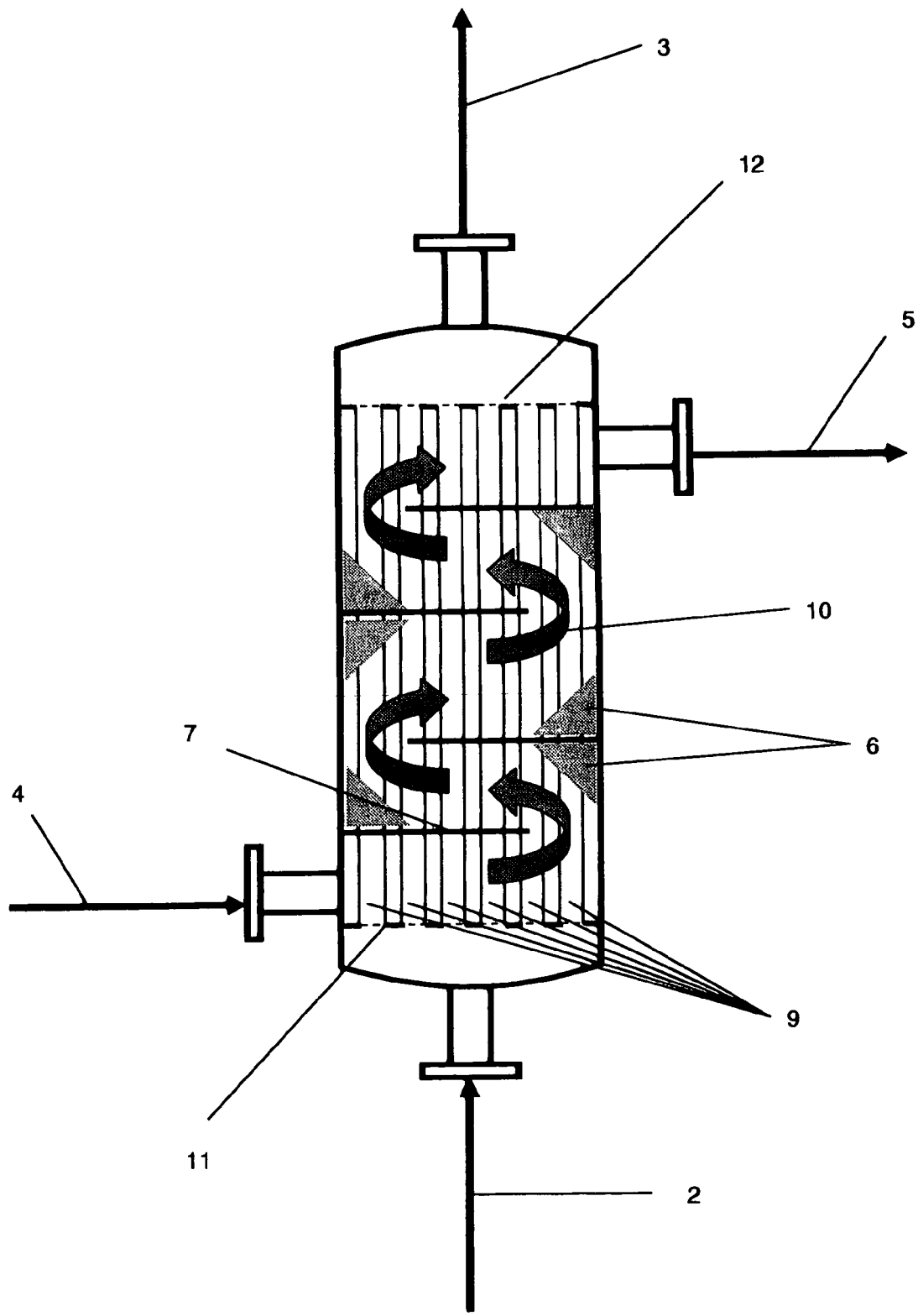

FIG. 3 schematically shows the structure of a vertical shell-and-tube reactor according to the prior art, wherein a feed stream (2) is fed via the lower tube plate (11) into the internal tubes (9). After the reaction solution has passed through the internal tubes, the product stream (3) leaves the internal tubes at the upper tube plate (12). Just above the lower tube plate, a stream (4) of a cooling or heating medium is fed into the shell space of the reactor and flows through the reactor with its main flow direction from the bottom upward. Deflection plates (7) are installed with the intention of achieving a meandering flow and thus transverse flow (10) of the stream of cooling or heating medium against the internal tubes. Dead zones (6) of the reactor occur in regions at which the deflection plates (7) are fixed to the inside of the shell. After passing through the shell space of the reactor, the stream of cooling or heating medium leaves the reactor just below the upper tube plate (12) as outflow (5).

FIG. 4 schematically shows the structure of a vertical shell-and-tube reactor according to the invention, in which a feed stream (2) is fed via the lower tube plate (11) into the internal tubes (9) which, apart from short regions just below the upper tube plate (12) and just above the lower tube plate (11) are essentially entirely helical and have a noncircular cross section. After the reaction solution has passed through the internal tubes, the product stream (3) leaves the internal tubes at the upper tube plate (12). Just above the lower tube plate, a stream (4) of a cooling or heating medium is fed into the shell space of the reactor and flows through the reactor with its main flow direction from the bottom upward. As a result of the helical configuration of the internal tubes (9), turbulent flow (10) of the stream of cooling or heating medium around the interior tubes (9) is achieved. Dead zones as occur in the reactor according to the prior art as a result of the installation of numerous deflection plates are not present. After passing through the shell space of the reactor, the stream of cooling or heating medium leaves the reactor just below the upper tube plate (12) as outflow (5).

EXAMPLES

Example 1

Continuous Preparation of Propylene Oxide from Propene Using Hydrogen Peroxide

Hydrogen peroxide was reacted continuously with propylene in methanol as solvent at a molar ratio of propene: hydrogen peroxide of 1.3:1 in a main reactor. As catalyst, a titanium zeolite catalyst of the structure type TS-1 was used as a fixed-bed catalyst.

The main reactor was a shell-and-tube reactor having a length of 12 m and contained 5 helical tubes having an elliptical cross section and a cross-sectional area of 11.46 cm$^2$ in each case. Each of the elliptical tubes had 46 helical turns. The internal diameter of the shell of the reactor was 220 mm. The catalyst load was 220 $g_{H2O2}/(kg_{cat}h)$, and the reactor was operated isothermally. The cooling water temperature in the main reactor was 35-50° C., and the pressure was about 20 bar. The conversion based on hydrogen peroxide was about 90%.

The reaction mixture from the main reactor was passed to an intermediate separation stage, wherein the propylene oxide prepared and unreacted propene were separated off by distillation. The solvent and the hydrogen peroxide which had not been reacted in the main reactor were passed to the after-reactor.

In an after-reactor, viz. an adiabatically operated shaft reactor having a diameter of 150 mm and a length of 5 m, unreacted hydrogen peroxide from the main reactor was reacted with propylene in a molar ratio of 1:1.3. As catalyst, the type of catalyst used in the main reactor was employed. The throughput over the catalyst in the after-reactor was 55 $g_{H2O2}/(kg_{cat}h)$. The inflow temperature in the after-reactor was 26-28° C., and the pressure was about 10 bar.

The total yield of propylene oxide based on hydrogen peroxide over the two reactors was from 93.7 to 94%.

Comparative Example

Continuous Preparation of Propylene Oxide from Propene Using Hydrogen Peroxide

Hydrogen peroxide was reacted continuously with propylene in methanol as solvent at a molar ratio of propene: hydrogen peroxide of 1.3:1 in a main reactor. As catalyst, use was made of a titanium zeolite catalyst of the structure type TS-1 installed as a fixed-bed catalyst.

The main reactor was a shell-and-tube reactor having a length of 12 m and contained 5 conventional straight tubes having a circular cross section and a cross-sectional area of 11.46 cm$^2$ in each case. A total of 28 deflection plates were installed equidistantly in the shell space to guide the flow of the cooling medium. The internal diameter of the shell of the reactor was 220 mm. The catalyst load was 220 $g_{H2O2}/(kg_{cat}h)$, and the reactor was operated isothermally. The cooling water temperature in the main reactor was 35-50° C., and the pressure was about 20 bar. The conversion based on hydrogen peroxide was about 90%.

The reaction mixture from the main reactor was passed to an intermediate separation stage, wherein the propylene oxide prepared and unreacted propene were separated off by distillation. The solvent and the hydrogen peroxide which had not been reacted in the main reactor were passed to the after-reactor.

In an after-reactor, viz. an adiabatically operated shaft reactor having a diameter of 150 mm and a length of 5 m, unreacted hydrogen peroxide from the main reactor was reacted with propylene in a molar ratio of 1:1.3. As catalyst, the type of catalyst used in the main reactor was employed. The throughput over the catalyst in the after-reactor was 55 $g_{H2O2}/(kg_{cat}h)$. The inflow temperature in the after-reactor was 26-28° C., and the pressure was about 10 bar.

The total yield of propylene oxide based on hydrogen peroxide over the two reactors was from 91.8 to 92%.

LIST OF REFERENCE NUMBERS

In FIGS. 1a and 1b,
(1) denotes the linear axis about which the internal tube is twisted,
(1a) denotes the projection of the cross section, and
(1b) denotes the projection of a cross section in a section of the tube.

In FIG. 3,
(2) denotes the feed stream,
(3) denotes the product stream,
(4) denotes the inflowing stream of cooling or heating medium,
(5) denotes the outflowing stream of cooling or heating medium,
(6) denotes dead zones in the reactor,
(7) denotes deflection plates,
(8) denotes the shell,
(9) denotes internal tubes,
(10) indicates the meandering flow of the cooling or heating medium through the reactor,
(11) denotes the lower tube plate and
(12) denotes the upper tube plate.

In FIG. 4,
(2) denotes the feed stream,
(3) denotes the product stream,
(4) denotes the inflowing stream of cooling or heating medium,
(5) denotes the outflowing stream of cooling or heating medium,
(8) denotes the shell,
(9) denotes internal tubes,
(10) indicates the turbulent flow of the cooling or heating medium around the tubes in the space within the shell of the reactor,
(11) denotes the lower tube plate and
(12) denotes the upper tube plate.

We claim:

1. A process for the continuous preparation of a chemical compound in at least one reactor, wherein at least one of the reactors is a shell-and-tube reactor which has a shell and at least one internal tube located within the shell, wherein at least one of the internal tubes has, at least in part, a noncircular cross section and a helical configuration in the region in which it is surrounded by the shell.

2. The process as claimed in claim 1, wherein the noncircular cross section has both mutually opposite straight sides and mutually opposite round sides or has the shape of an oval or the shape of an ellipse.

3. The process as claimed in claim 1, wherein the helix has from 1 to 2000 complete turns in the region surrounded by the shell.

4. The process as claimed in claim 1, wherein from 1 to 20,000 internal tubes having a noncircular cross section are located in a helical configuration within the shell.

5. The process as claimed in claim 1, wherein an olefin is reacted with a hydroperoxide in the presence of at least one zeolite catalyst to form an epoxide in the reactor.

6. The process as claimed in claim 1, wherein an olefin is reacted with a hydroperoxide in the presence of at least one zeolite catalyst to form an epoxide in the reactor for the continuous preparation of a chemical compound comprising the stages (i) to (iii)

(i) reaction of the olefin with hydroperoxide to give a mixture comprising epoxide, unreacted olefin and unreacted hydroperoxide,
(ii) separation of the epoxide and the unreacted olefin from the mixture resulting from stage (i) to give a mixture comprising unreacted hydroperoxide,
(iii) reaction of the mixture comprising unreacted hydroperoxide with olefin,
wherein at least one shell-and-tube reactor as defined in claim 1 is used for the reaction of the olefin in at least one of the stages (i) and (iii).

7. The process for the continuous preparation of a chemical compound, wherein an olefin is reacted with a hydroperoxide in the presence of at least one zeolite catalyst to form an epoxide in the reactor comprising the stages (i) to (iii)

(i) reaction of the olefin with hydroperoxide to give a mixture comprising epoxide, unreacted olefin and unreacted hydroperoxide,
(ii) separation of the epoxide and the unreacted olefin from the mixture resulting from stage (i) to give a mixture comprising unreacted hydroperoxide,
(iii) reaction of the mixture comprising unreacted hydroperoxide with olefin, wherein at least two isothermal shell-and-tube reactors as defined in claim 1 connected in parallel are used in stage (i) and at least one adiabatic shaft reactor is used in stage (iii), wherein the noncircular cross section has both mutually opposite straight sides and mutually opposite round sides or has the shape of an oval or the shape of an ellipse, wherein the overall selectivity of the reaction is in the range of from 90 to 96%, based on hydroperoxide, and the total hydroperoxide conversion is at least 99.5%.

8. The process as claimed in claim 5, wherein propene is used as olefin, hydrogen peroxide is used as hydroperoxide and a titanium zeolite catalyst is used as catalyst.

9. The process as claimed in claim 8, wherein the titanium zeolite catalyst has the TS-1 structure and methanol is used as solvent.

10. A shell-and-tube reactor for the continuous preparation of a chemical compound, comprising a shell and at least one noncircular cross-section internal tube located within the shell, wherein at least one of the internal tubes having the noncircular cross section is at least partly helical in the region in which it is surrounded by the shell.

11. The shell-and-tube reactor as claimed in claim 10, wherein the noncircular cross section has both mutually opposite straight sides and mutually opposite round sides or has the shape of an oval or the shape of an ellipse.

12. The shell-and-tube reactor as claimed in claim 10, wherein the helix has from 1 to 2000 complete turns in the region surrounded by the shell.

13. The shell-and-tube reactor as claimed in claim 10, wherein from 1 to 20,000 internal tubes having a noncircular cross section are located in a helical configuration within the shell.

14. The shell-and-tube reactor as claimed in claim 10, wherein at least one region of at least one of the internal tubes contains at least one fixed-bed catalyst.

15. The shell-and-tube reactor as claimed in claim 14, wherein at least one fixed-bed catalyst is a titanium zeolite catalyst.

16. An apparatus for the continuous preparation of a chemical compound, comprising at least one shell-and-tube reactor according to claim 10.

17. The apparatus as claimed in claim 16 further comprising at least one separation device.

18. The apparatus as claimed in claim 16, comprising at least two shell-and-tube reactors for the continuous preparation of a chemical compound connected in parallel, comprising a shell and at least one noncircular cross section internal tube located within the shell, wherein at least one of the internal tubes having the noncircular cross section is at least partly helical in the region in which it is surrounded by the shell, wherein said apparatus further comprises a distillation column downstream of these at least two shell-and-tube reactors and at least one shaft reactor downstream of the distillation column.

19. A method of improving the selectivity in the preparation of a chemical compound wherein the preparation is carried out in a shell-and-tube reactor according to claim 10.

20. The process as claimed in claim 1, wherein an olefin is reacted with a hydroperoxide in the presence of at least one zeolite catalyst to form an epoxide in the reactor comprising the stages (i) to (iii)

(i) reaction of the olefin with hydroperoxide to give a mixture comprising epoxide, unreacted olefin and unreacted hydroperoxide, (ii) separation of the epoxide and the unreacted olefin from the mixture resulting from stage (i) to give a mixture comprising unreacted hydroperoxide, (iii) reaction of the mixture comprising unreacted hydroperoxide with olefin, wherein propene is used as olefin, hydrogen peroxide is used as hydroperoxide and a titanium zeolite catalyst having the TS-1 structure is used as catalyst, wherein at least two isothermal shell-and-tube reactors as defined in claim 1 connected in parallel are used in stage (i), wherein the noncircular cross section has both mutually opposite straight sides and mutually opposite round sides or has the shape of an oval or the shape of an ellipse, and at least one adiabatic shaft reactor is used in stage (iii), wherein the overall selectivity of the reaction is in the range of from 90 to 96%, based on hydroperoxide, and the total hydroperoxide conversion is at least 99.5%, wherein the helix has from 1 to 2000 complete turns in the region surrounded by the shell and wherein from 1 to 20,000 internal tubes having a noncircular cross section are located in a helical configuration within the shell.

\* \* \* \* \*